June 29, 1954 E. F. SHEPHERD 2,682,126
HOLDER FOR THREADING FISHHOOKS
Filed July 18, 1952

INVENTOR
EDWARD F. SHEPHERD
ATTORNEYS

Patented June 29, 1954

2,682,126

UNITED STATES PATENT OFFICE 2,682,126

HOLDER FOR THREADING FISHHOOKS

Edward Ferrier Shepherd, Salt Lake City, Utah

Application July 18, 1952, Serial No. 299,765

8 Claims. (Cl. 43—1)

The invention set out in the following specification relates to an improved holder for threading fish hooks.

In threading leaders into the eyes of fish hooks, it is necessary to hold the hook firmly and to direct the end of the leader into the eye of the hook. This is awkward, as one must grasp the hook in a way that exposes the fingers to the barbs of the hook and requires close attention and skill in threading the leader properly.

This invention is directed to a means for holding the fish hook so that it does not require close handling by the fisherman. At the same time, the leader is directed accurately into the eye of the fish hook. The device is of particular value in threading leaders into casting flies.

It is one object of my invention to have mechanical means for holding the fly firmly during threading.

Another object of the invention is to assure the accurate threading of the leader into the eye of the fish hook.

A further object of my invention is to make the device of transparent plastic material so that the visibility will facilitate placing the eye of the hook in proper position to receive the leader which is constrained to go into the eye.

The invention is suitable for a wide variation in size of flies. It is moreover easy to manipulate and requires no particular skill or training.

The device is simple to construct, cheap, rugged and durable.

As illustrating the invention I have shown the preferred form of the device in the accompanying drawings in which.

Figure 1:
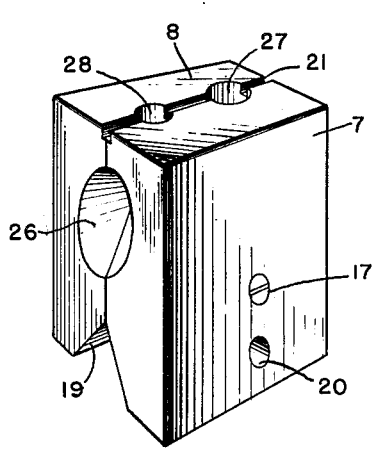
Fig. 1 is a perspective view of the improved holder for fish hooks.

Briefly described the invention consists in providing complementary holding blocks which form a vise in which the fly or fish hook is held and by which the leader is directed into the eye of the hook.

The device consists primarily of two complementary blocks 7 and 8. These blocks are made of transparent plastic or similar material so that there is clear visibility through them. The block 7, on its inner face, has two hemispherical bosses 9 and 10 which are transversely disposed near the bottom of the faces. These bosses are received in complementary recesses 11 and 12 formed in the opposite side face of the block 8. The bosses 9 and 10 thus form projections which move in and out of the recesses 11 and 12 and thus maintain the blocks in proper vertical alignment.

Both blocks 7 and 8 are drilled transversely at a substantially central point to receive a bolt 13. This bolt carries a hexagonal nut 14 in the block 8. A counterbore 15 in block 7 holds a helical spring 16 under the head 17 of the bolt.

The lower inner faces of the blocks are flared as at 18 and 19 to permit the blocks to rock on the meeting edges of the flaring portions. This allows the inner faces of the blocks to open up against the compression of spring 16. The extent of opening is limited by the amount of compression of the spring 16 under the head 17 of the bolt.

The lower end of the block 7 is bored transversely to provide a hole 20 through which a cord may be tied, and thus the device fastened to the lapel of a coat or similar garment.

Figure 2:
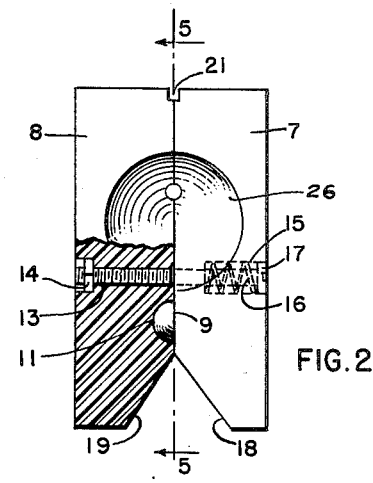
Fig. 2 is an end elevation of the same partly in section.
Figure 3:
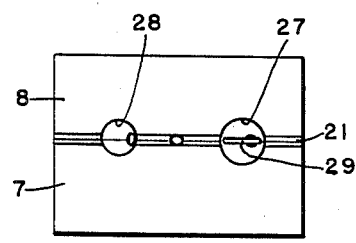
Fig. 3 is a top plan view of the holder.

The meeting edges of the blocks 7 and 8 are cut back, as shown in Figs. 1 and 2, to provide a groove 21.

From a central point in this groove, two passageways 22 and 23 are formed by recesses cut in the crossing faces of the blocks and extend in diagonal directions downwardly toward the end faces of the blocks 7 and 8.

The lower end of the passageway 22 is flared outwardly, as shown at 24, to form a funnel-shaped opening to facilitate the entrance of the leader 25.

The opposite passageway 23 is flared outwardly at the bottom, as shown at 26, for a similar purpose.

A cavity or compartment is formed by aligned recesses in the opposing faces of the blocks 7 and 8 from the top groove downwardly to intersect the passageway 22. The cavity 27 crosses the passageway 22, as shown in Fig. 5 to form the extension 31.

A similar cavity or compartment 28 is formed in the opposing faces of the blocks 7 and 8 to intersect the passageway 23 beyond which it extends as at 32.

The cavities 27 and 28 are of differing size in order to receive the large and small fish hooks or flies 29 and 30.

Figure 4:
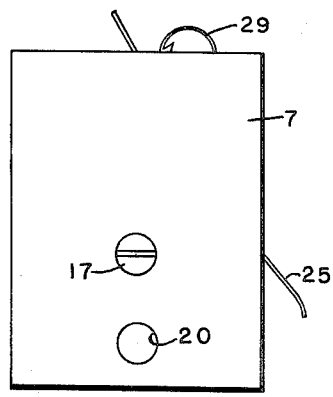
Fig. 4 is a side elevation.
Figure 5:
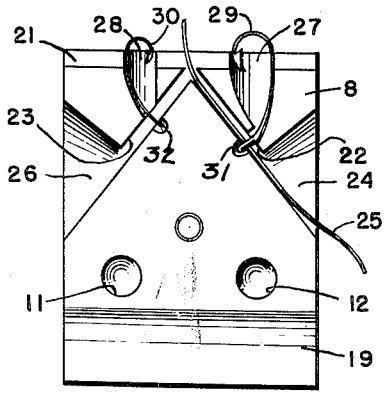
Fig. 5 is a side view of the block 8 taken in the direction of the arrows 5, 5 of Fig. 2
Figure 6:
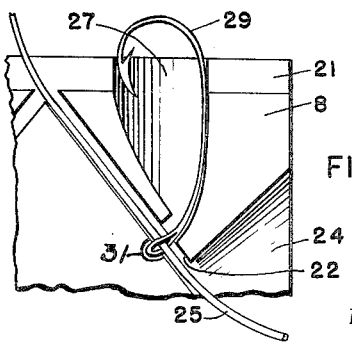
Fig. 6 is an enlarged fragmentary elevation of part of Fig. 5.

As shown more particularly in Figs. 4 and 5, the leader 25 may be passed into one of the flaring entrances 24 and 26, and through one of the passageways 22 or 23. There the leader passes through the eye of the fish hook which is centered in the passageway due to the extent of the cavities 27 and 28.

The end of the leader is brought out through the groove 21, and after the blocks have been spread apart, the end of the leader may be knotted in the usual way.

From the above description it will be observed that the flies or fish hooks are fitted into the cavities 27 and 28. Thus the barbs are held in groove 21, and the eyes are centered across the passageways 22 and 23. This permits the fisherman to use both hands for holding the device and directing the leader upwardly through the passageway. At the same time, due to the transparency of the blocks, he can see whether the leader is passing through the eye of the fish hook.

The device is easy to construct and cheap to manufacture. It is extremely durable and found to be very convenient for quickly and efficiently threading the leader. It prevents damage to the fragile material of the casting fly.

While the preferred form has been shown by way of illustration, the invention is limited only by the scope of the appended claims.

What I claim is:

1. A device for threading leaders on fish hooks comprising two blocks disposed face to face, complementary bearing portions on the opposing faces of the blocks for holding them in pivotal positions, fastening means for holding the blocks face to face and, a spring on the fastening means to permit pivotal movement of the blocks on the bearing formations, said blocks having a tapering compartment formed by aligned recesses in the opposing faces of the blocks to hold a fish hook, and said faces having opposing recesses defining a passageway communicating with and intersecting the inner end of the compartment.

2. A device for threading leaders on fish hooks comprising two blocks disposed face to face, two bosses on one face of one block, the opposing face of the other block being correspondingly recessed, fastening means for holding the blocks with the bosses in the recessed face and a spring on the fastening means to permit pivotal movement of the blocks around the lower edges of said faces, said block having a compartment formed by aligned recesses in their opposing sides to hold a fish hook, and said faces having opposing recesses defining a passageway communicating with and intersecting the inner end of the compartment.

3. A device for threading leaders on fish hooks comprising two blocks disposed face to face, bearing members on a face of one block interfitting with the opposing face of the other block, a bolt carried transversely through the blocks above the bearing members and a spring on the bolt, said blocks having aligned recesses in the opposing faces to form a tapering compartment to hold a fish hook, and said faces having opposing recesses defining a passageway communicating with and intersecting the inner end of the compartment.

4. A device for threading leaders on fish hooks comprising two blocks disposed face to face, bearing members on a face of one block interfitting with the opposing face of the other block, a bolt carried transversely through the blocks above the bearing members and a spring on the bolt, said blocks having aligned recesses in the opposing faces to form a tapering compartment to hold a fish hook, said faces having opposing recesses defining a passageway communicating with and intersecting the inner end of the compartment, the faces of the blocks being flared outwardly at the lower end of the passageway.

5. A device for threading leaders on fish hooks comprising two blocks, disposed face to face, bearing members on a face of one block interfitting with the opposing face of the other block, a bolt carried transversely through the centers of the blocks above the bearing members and a spring on the bolt, said blocks having aligned recesses in the opposing faces to form a compartment to hold a fish hook outwardly of the centers thereof and said faces having opposing recesses defining passageways extending diagonally in from the outer edges of the blocks and meeting at the center of the top face.

6. A device for threading leaders on fish hooks comprising two blocks, disposed face to face, bearing members on a face of one block interfitting with the opposing face of the other block, a bolt carried transversely through the centers of the blocks above the bearing members and a spring on the bolt, said blocks having aligned recesses in the opposing faces to form a compartment to hold a fish hook outwardly of the centers thereof and said faces having opposed aligned recesses defining passageways extending diagonally in from the outer edges thereof and meeting at the center of the top, the faces of the blocks being flared outwardly at the lower end of each passageway.

7. A device for threading leaders on fish hooks comprising two blocks disposed face to face, bearing members on a face of one block interfitting with the opposing face of the other block, a bolt carried transversely through the centers of the blocks above the bearing members and a spring on the bolt, said blocks having aligned recesses in the opposing faces to form a compartment to hold a fish hook, the upper edges of the faces being cut away to form a narrow groove, said faces having opposing recesses defining a passageway extending between the outer ends and the groove and intersecting the inner end of the compartment.

8. A device for threading leaders on fish hooks comprising two transparent blocks disposed face to face, bearing members on a face of one block interfitting with the opposing face of the other block, a bolt carried transversely through the centers of the blocks and a spring on the bolt, said blocks having aligned recesses in the opposing faces to form a compartment to hold a fish hook visible through the blocks, said faces having opposing recesses defining a passageway communicating with and intersecting the inner end of the compartment.

References Cited in the file of this patent

UNITED STATES PATENTS

| Number | Name | Date |
| --- | --- | --- |
| 1,501,816 | Seppmann | July 15, 1924 |
| 1,661,365 | Gendron | Mar. 6, 1928 |
| 1,915,154 | Schebeko | June 20, 1933 |
| 2,418,626 | Damrell | Apr. 8, 1947 |
| 2,479,356 | Hennes | Aug. 16, 1949 |